Nov. 29, 1932.    W. R. RUSH    1,889,381
FOOD CHOPPER
Filed Oct. 21, 1930
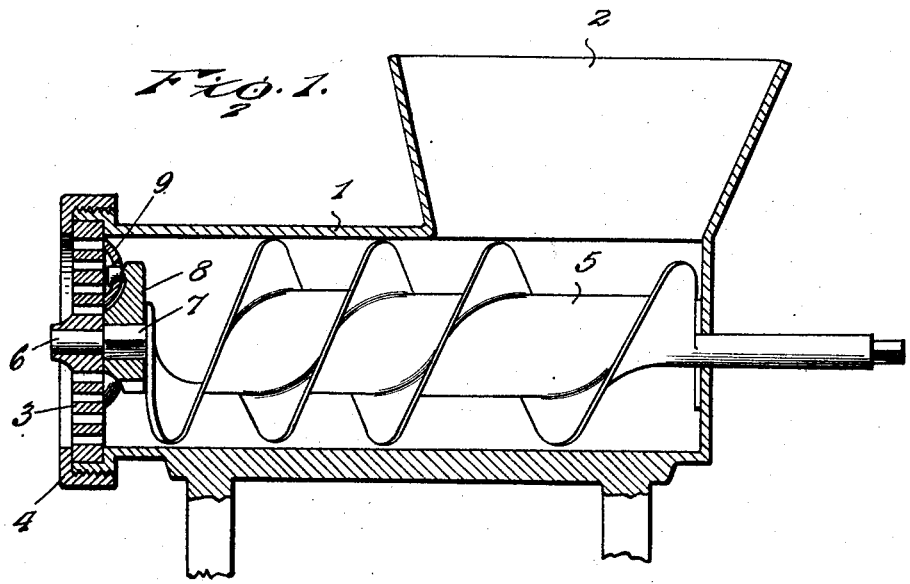
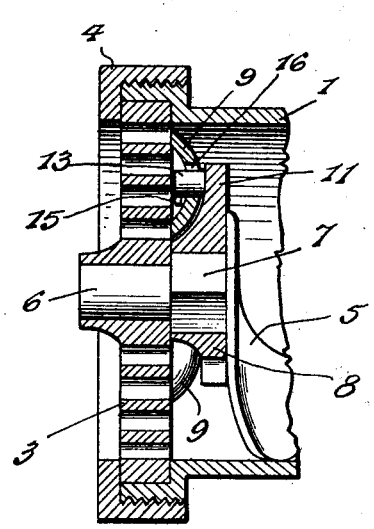
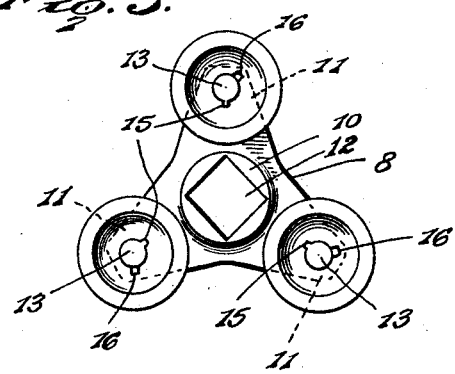
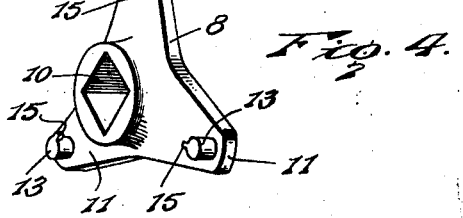
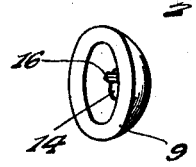
Inventor
W. R. Rush.
By Lacey & Lacey,
Attorneys Patented Nov. 29, 1932

1,889,381

UNITED STATES PATENT OFFICE

WILLIAM R. RUSH, OF MULBERRY, KANSAS

FOOD CHOPPER

Application filed October 21, 1930. Serial No. 490,284.

This invention relates to machines for comminuting food, being designed most especially for meat grinders to insure a clean cutting of the meat by a shearing action without tearing the same apart.

The invention further provides a machine of the character aforesaid embodying a plurality of disk cutters capable of two-fold movement, that is, they are positively driven as a unit, and may idle independently of each other about individual axes, the cutters being held against the perforated discharge plate during such movements and producing a clean cut.

The invention also contemplates a grinding machine which is operable by the expenditure of a small amount of energy compared with the output, and which embodies a small number of parts and is capable of being easily and quickly taken apart for cleaning and readily assembled for service, as occasion may require.

While the drawing illustrates a preferred embodiment of the invention, it is to be understood that in adapting the means to meet specific needs and requirements, the design may be varied and such changes in the minor details of construction resorted to within the scope of the invention as claimed, without departing from the spirit thereof.

For a full understanding of the invention and the merits thereof, reference is to be had to the following description and the drawing hereto attached, in which,—

Figure 1 is a vertical, central, longitudinal sectional view of a grinding machine illustrative of an embodiment of the invention, Fig. 2 is an enlarged detail sectional view of an end portion, Fig. 3 is an elevational view of the cutter, Fig. 4 is a detail perspective view of the holder, and Fig. 5 is a detail perspective view of a disk cutter.

Corresponding and like parts are referred to in the following description and designated in the several views of the drawing by like reference characters.

The machine embodies a casing 1 which is provided adjacent its front end with a hopper 2. The rear end of the casing 1 is enlarged and receives a plate 3 which is perforated for the discharge of the material as the same is ground or chopped. A confining ring 4 is threaded to the rear end of the casing 1 and retains the perforated plate 3 in position. A screw conveyer 5 is mounted within the casing and is provided at opposite ends with shaft extensions which are mounted in the front end of the casing and the plate 3. In the operation of the machine, the screw conveyer 5 is adapted to be rotated in any desired way. The extension at the delivery end of the conveyer 5 includes a circular portion 6 and an angular or non-circular portion 7, the part 6 being journaled in the plate 3.

The cutter includes a holder 8 and a plurality of disks 9. The holder comprises a hub 10 and radial arms 11. A non-circular opening 12 formed in the hub 10 coincides with the non-circular or angular portion 7 of the conveyer extension so that the holder and conveyer will rotate in unison when the machine is in operation. A stud, projection or journal 13 projects laterally from each of the arms 11 and receives a disk cutter 9 which is free to rotate thereon and held in place against accidental disengagement. The holder 8 is detachably fitted to the forward extension of the conveyer 5. The disk cutters 9 are of like formation and are of concavo-convex outline and each is formed with a central opening 14 to snugly receive the projection or journal 13. A lug 15 projects laterally from the outer end of each of the parts 13 and is adapted to pass through a notch 16 formed at one side of the opening 14. When the disk cutter 9 is properly positioned upon the journal or part 13, the lug 15 is disposed forwardly of the cutter and out of registry with the notch 16 whereby to retain the cutter against accidental displacement from the journal 13. The marginal portion of the cutting disk is ground to produce an outer cutting edge which coacts with the perforated plate 3 in a manner well understood for ready severance of the food when the machine is in operation.

It is observed that the cutter as a whole revolves with the conveyer 5 and the cutting disks 9 idle on the respective parts 13 upon which they are mounted. This results in an equalization of the cutting edges and a clean cutting of the food by a shearing action and in consequence a minimum expenditure of energy results in the operation of the machine. To dismember the machine for cleaning or other purpose, the retaining ring 4 is removed and the plate 3 detached. This admits of the cutter being readily withdrawn from the front extension of the conveyer 5. If it be desired to remove the conveyer, the same may be drawn outward from the casing. The cutting disks 9 may be easily and quickly removed from the holder and after the parts have been cleaned, they may be readily assembled and made secure by replacement of the ring 4, as will be readily appreciated.

Having thus described the invention, I claim:

1. In a food chopper or grinding machine and in combination with the usual screw conveyer provided with a forward extension, a cutter removably fitted upon said extension and rotatable with the conveyer and comprising a holder having forward projections and lateral lugs adjacent their outer ends, and disk cutters formed with central openings to receive the projections of the holder, and having notches at a side of the openings to clear the lugs of said projections to admit of readily removing or placing the disk cutters in position.

2. A cutter to be detachably fitted to the screw conveyer of a food chopper or grinder, the same comprising a holder including a hub and radial arms, the latter being provided with projections having lateral lugs at their outer ends, and concavo-convex disk cutters having central openings to receive the projections of the holder, and notches at a side of the openings to admit of the ready passage of the said lugs.

3. The combination with a screw conveyer for a food chopper or grinder having a forward extension provided with a non-circular portion, of a holder comprising a hub and radial arms, the hub having a non-circular opening to snugly fit the non-circular portion of the extension, and the arms being provided with projections having side lugs adjacent their outer ends, and concavo-convex disk cutters provided with central openings to receive said projections and having notches at a side of the openings for clearance of the side lugs of the said projections.

In testimony whereof I affix my signature.

WILLIAM R. RUSH. [L. S.]